United States Patent
Johnson et al.

(10) Patent No.: US 11,751,040 B2
(45) Date of Patent: Sep. 5, 2023

(54) SYSTEM AND METHOD FOR DETECTING A CELLULAR DEVICE

(71) Applicant: Epiq Solutions, Schaumburg, IL (US)

(72) Inventors: Michael Johnson, Schaumburg, IL (US); Aaron Madsen, Schaumburg, IL (US); John Orlando, Schaumburg, IL (US)

(73) Assignee: Epiq Solutions, Schaumburg, IL (US)

( * ) Notice: Subject to any disclaimer, the term of this patent is extended or adjusted under 35 U.S.C. 154(b) by 0 days.

(21) Appl. No.: 17/387,153

(22) Filed: Jul. 28, 2021

(65) Prior Publication Data

US 2021/0368323 A1 Nov. 25, 2021

Related U.S. Application Data

(63) Continuation of application No. 15/605,147, filed on May 25, 2017, now abandoned.

(51) Int. Cl.
*H04W 8/00* (2009.01)
*H04W 48/16* (2009.01)

(52) U.S. Cl.
CPC ........... *H04W 8/005* (2013.01); *H04W 48/16* (2013.01)

(58) Field of Classification Search
CPC .............................. H04W 8/005; H04W 48/16
See application file for complete search history.

(56) References Cited

U.S. PATENT DOCUMENTS

| | | | | |
|---|---|---|---|---|
| 2012/0040650 | A1* | 2/2012 | Rosen | H04M 3/2218 455/414.1 |
| 2012/0252463 | A1* | 10/2012 | Zou | G01S 5/14 455/456.6 |
| 2013/0183931 | A1* | 7/2013 | Company | H04W 12/12 455/410 |
| 2014/0177748 | A1* | 6/2014 | Malaga | H04B 1/0017 375/267 |
| 2015/0341921 | A1* | 11/2015 | Chen | H04W 74/004 370/330 |
| 2016/0285650 | A1* | 9/2016 | Katabi | H04B 1/16 |
| 2017/0289960 | A1* | 10/2017 | Moustafa | H04J 11/0069 |
| 2018/0184309 | A1* | 6/2018 | Bhardwaj | H04W 72/0453 |

OTHER PUBLICATIONS

How Detectors Sniff Out Cell Phones Up to a Mile Away, Berkeley Varitronics Systems, https://www.bvsystems.com/wp-content/uploads/2015/04/How_Detectors_Sniff_Out_Cell_Phones_Up_To_A_Mile_Away.pdf downloaded Dec. 12, 2016 (2 pages).

(Continued)

*Primary Examiner* — Minjung Kim
(74) *Attorney, Agent, or Firm* — McAndrews, Held & Malloy, Ltd.

(57) ABSTRACT

Methods and systems for cellular device detection are presented. A wideband receiver is operable to acquire a block of digitized samples in an uplink frequency band. The wideband receiver is also operable to applying one or more computational kernels to the block of digitized samples, thereby determining a possible uplink transmission from the cellular device. The cellular device is confirmed when the bandwidth of the possible uplink transmission is verified and a cellular basestation, associated with the possible uplink transmission, is located.

24 Claims, 5 Drawing Sheets

(56) References Cited

OTHER PUBLICATIONS

The Pros & Cons of Cell Phone Detection Methods, Berkeley Varitronics Systems, https://www.bvsystems.com/wp-content/uploads/2015/04/Pros_and_Cons_of_Cell_Phone_Detection.pdf; downloaded Dec. 12, 2016 (2 pages).
Cellphone detector TransitHound, Cell Phone Detection For Distracted Operators, Berkeley Varitronics Systems, https://www.bvsystems.com/wp-content/uploads/2015/11/TransitHound.pdf; downloaded Dec. 12, 2016(2 pages).
TransitHound, Cellphone Detector, User Manual Version 1.4, https://www.bvsystems.com/wp-content/uploads/2015/11/TransitHound_User_Manual.pdf; downloaded Dec. 12, 2016 (12 pages).
Cellphone Monitor WatchHound, 24-7 Cell Phone Security Monitor, Berkeley Varitronics Systems, http://www.bundpol.com/detect/pdf-loads/Watchhound-ENGLISH.pdf; downloaded Dec. 12, 2016 (2 pages).
Cellphone Monitor WatchHound, User's Manual Version 1.5, https://www.bvsystems.com/Tech/Manuals/WatchHound1.5.pdf; downloaded Dec. 12, 2016 (43 pages).

\* cited by examiner

SYSTEM AND METHOD FOR DETECTING A CELLULAR DEVICE

PRIORITY CLAIM

The present application is a continuation of U.S. application Ser. No. 15/605,147 filed May 25, 2017, which is hereby incorporated herein by reference.

BACKGROUND

Limitations and disadvantages of conventional method and systems for detecting a cellular device will become apparent to one of skill in the art, through comparison of such systems with some aspects of the present invention as set forth in the remainder of the present application with reference to the drawings.

BRIEF SUMMARY OF THE INVENTION

Systems and methods are provided for accurate detection of a cellular device, substantially as shown in and/or described in connection with at least one of the figures, as set forth more completely in the claims.

Advantages, aspects and novel features of the present disclosure, as well as details of an illustrated embodiment thereof, will be more fully understood from the following description and drawings.

DETAILED DESCRIPTION OF THE INVENTION

Accurate detection of cellular devices in a moving vehicle is desired for numerous security, safety, and regulatory reasons.

Figure 1:
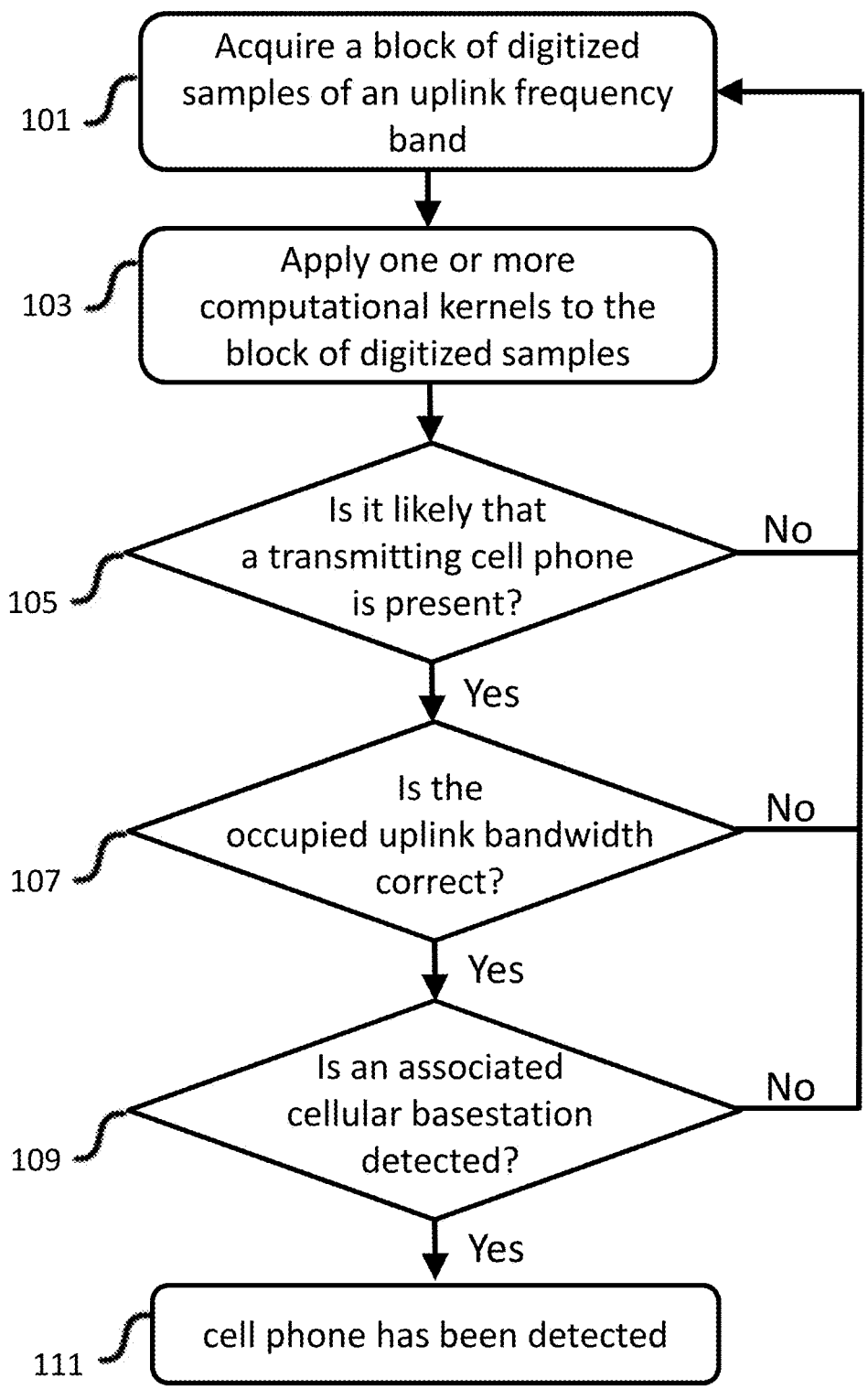
FIG. 1 is a flowchart illustrating an example process for detection of a cellular device in accordance with aspects of this disclosure.

FIG. 1 is a flowchart illustrating an example process for accurate detection of a cellular device in accordance with aspects of this disclosure. According to the licensed RF uplink cellular bands in use in a given location, a plan for RF scanning of these uplink cellular bands may be identified. This plan may provide for scanning all RF uplink cellular bands of interest with a minimum of RF tuning frequencies (i.e., by using the maximum receiver bandwidth per RF tuning frequency). The process in FIG. 1 begins with block 101 in which an RF signal processing receiver acquires a block of digitized samples in an uplink frequency band. The RF signal processing receiver may iterate through each tuning frequency in the frequency plan, acquiring a large contiguous block of digitized samples at each step. Accordingly, the RF signal processing receiver may be a wideband receiver that captures multiple cellular channels simultaneously.

In block 103, one or more computational kernels are applied to the block of digitized samples to determine the likelihood of the presence of a cellular uplink signal from a transmitting cellular device. Each cellular technology (GSM, UMTS, LTE, etc.) may have its own specific computational kernel for determining the likelihood of the presence of a transmitting cellular device. Multiple signal processing devices, either collocated or remote from each other, may operate simultaneously in block 103. The computational kernel may run on the signal processing receiver or may run remote from the signal processing receiver. For example, the digitized samples may be transferred to a remote server where the computational kernel may be run.

While the presence of RF power in an uplink cellular band can be an indicator that a cellular device is present, RF power alone cannot definitively identify a cellular device. Though the cellular uplink bands are licensed bands, and thus only licensed devices are allowed to transmit in these bands, it is quite common to have sporadic and unintended RF signals in these bands. Without further qualification, sporadic and unintended RF signals could be falsely identified as cellular devices requesting network access. Systems that rely on RF power alone in an uplink cellular band to identify cellular device requesting network access often suffer from a high false positive rate and thus exhibit poor reliability and/or usability.

The computational kernel is designed to identify a triggering event in block 103. The triggering event, and thus detection of a potential uplink transmission, can be based on one or more physical layer measurements. The triggering event in a cellular uplink band may include a high RF power level, a high signal-to-noise ratio (SNR), a likely presence of a known sequence or signal within the received signal, or specific properties or structures of the received signal which indicate the received signal is likely structured instead of random noise. Signal properties or structures may include occupied bandwidth, signal duration, and/or signal autocorrelation. As an example of signal bandwidth, UMTS uplink transmissions occupy 3.84 MHz of bandwidth, whereas LTE uplink transmissions occupy a multiple of 180 kHz of bandwidth. Thus, an identification of the standard will determine the occupied uplink bandwidth to be expected. As an example of signal duration, LTE uplink transmissions, especially uplink control channel transmissions, are often limited of 0.5 milliseconds in duration.

In some cellular systems, uplink transmissions are channelized or localized in the frequency domain. One example of this is LTE, where uplink transmissions are localized to be certain multiples of a resource block, which is 12 subcarriers, each 15 kHz wide, for a total of 180 kHz per resource block. In such cases, it may be advantageous to process the uplink signal in the frequency domain to detect the triggering event. For example, the uplink signal may be transformed into the frequency domain, and a triggering event declared when the power in one or more frequency bins exceeds a threshold.

A computational kernel for a given cellular technology (GSM, UMTS, LTE, etc.) in block 103 may yield a numerical score indicating the likelihood of the presence of an uplink signal and a list of possible carrier frequencies at which the uplink signal may reside. If the likelihood score from a computational kernel for a given technology exceeds a threshold at block 105, an uplink signal of that technology is deemed to be present and the method proceeds to block

107. If the likelihood scores from all computational kernels in block 103 fall below the threshold at block 107, a transmitting cellular device is deemed unlikely, and the method returns to block 101 where a new block of digitized samples is acquired. The new block of digitized samples may correspond to a next tuning frequency in the frequency plan.

In block 107, the occupied bandwidth of the potential uplink transmission is determined. If the bandwidth is commensurate with the cellular technology detected in block 105, a center frequency of the uplink transmission may be estimated and the method proceeds to block 109. If the bandwidth is not commensurate with the cellular technology detected in block 105, the method returns to block 101 where a new block of digitized samples is acquired. The new block of digitized samples may correspond to a next step in the frequency plan.

In block 109, one or more candidate downlink channels may be determined according to: 1) the uplink transmission technology (GSM, UMTS, LTE, etc.) indicated by the computational kernels in block 103; 2) the list of potential carrier frequencies of the uplink transmission indicated by the computational kernels in block 103; and 3) the pairing between downlink and uplink RF carrier frequencies in licensed cellular bands. The one or more candidate downlink channels may be surveyed to detect a cellular basestation transmitting on the downlink.

In block 109, the RF signal processing receiver may be used to perform a cellular network survey for each candidate downlink channel. This may be the same RF signal processing receiver used for acquiring samples of the uplink transmission in block 101. The cellular provider operating on an RF downlink frequency (AT&T, T-Mobile, Verizon, etc.) can be identified via a broadcast message. Typically, this information can be deduced by decoding the Mobile Network Code (MNC) being broadcasted by the basestation.

If the presence of a cellular downlink channel is confirmed, the exact band, channel, and RF frequency of the detected cellular device may also be confirmed. At this point, in block 111, a cellular device has been detected, qualified, and associated with a cellular provider, band, channel, and RF frequency.

If no cellular basestation is detected during the survey in block 109, the affirmative result detected in block 105 and 107 may be declared a false positive, and the method returns to block 101 where a new block of digitized samples is acquired. The new block of digitized samples may correspond to a next tuning frequency in the frequency plan.

An alternate version of the above method can be employed for cases where the cellular basestations in an area are known. For example, if a cellular survey has already been performed, a Cell Network Descriptor List (CNDL) may accessible. This CNDL would contain cell survey details, such as RF downlink frequency, paired uplink frequency, RF channel number, RF band, Mobile Network Code (MNC), and others. If this CNDL is available, the detection of cellular uplink transmissions from block 105 and 107 can be immediately verified against the CNDL to confirm whether or not the cellular uplink transmission properly corresponds to a known cellular downlink transmission. This speeds up the overall process of detecting and reporting a cellular device, since spectrum processing in block 109 is no longer required. Having access to a predetermined CNDL is particularly advantageous when a cellular environment is rapidly changing (i.e., in a train or other moving vehicle).

The CNDL may be populated, for example, by a third party using an RF signal processing receiver that comprises a cellular network survey. During a cellular network survey, cell synchronization may be achieved in both frequency and timing. Cell synchronization may also yield details of the frame structure used by the particular basestation. When the RF signal processing receiver is synchronized with a particular basestation, downlink broadcast messages from a basestation can be received, demodulated and decoded. Successful decoding of these broadcast messages confirms the presence of the basestation, the cellular technology employed by the basestation (e.g., GSM, UMTS, FD-LTE, etc.), and the RF downlink frequency, channel and/or band. If the cellular technology of a candidate basestation is unknown to begin with, a complete cellular network survey may require the receiver to repeat basestation analysis for the possible cellular technologies. The contents of the broadcast messages that were successfully decoded may be stored in the CNDL. The CNDL may also store additional relevant data such as the cellular technology, MNC, cellular carrier (e.g., AT&T, T-Mobile, Verizon, etc.), and paired uplink frequency. Entries in the CNDL may also be associated with a GPS location. Additionally, the CNDL entries of one RF signal processing receiver may be shared with other RF signal processing receivers. The other RF signal processing receivers can be either collocated with or remote from the RF signal processing receiver which produced the CNDL information. For example, the RF signal processing receivers may comprise (or be operably coupled to) cellular data services.

The CNDL may be sorted based on a received signal strength indicator (RSSI), a received signal quality, or other fields within the CNDL. A sorted CNDL may be more appropriate for prioritizing basestations to which a nearby cellular device is likely to request access.

The basestation's confirmed cellular technology, downlink frequency, channel and/or band may be used to define the uplink parameters (e.g., uplink frequency, channel and/or band) to which a user can compare in block 109. A cellular standard may, for example, pair uplink frequencies with downlink frequencies. The cellular carrier (e.g., AT&T, T-Mobile, Verizon, etc.) may also be determined by decoding the Mobile Network Code (MNC) in a basestation's broadcast message. To use a CNDL to confirm the presence of a cellular downlink channel, the paired uplink frequency field of the CNDL is compared to the list of potential uplink carrier frequencies produced by the computational kernel. If a match is found, the presence of a cellular downlink channel is confirmed, and the exact band, channel, and RF frequency of the detected cellular device is thereby also confirmed. At this point, in block 111, a cellular device has been detected, qualified, and associated with a cellular provider, band, channel, and RF frequency.

Figure 2:
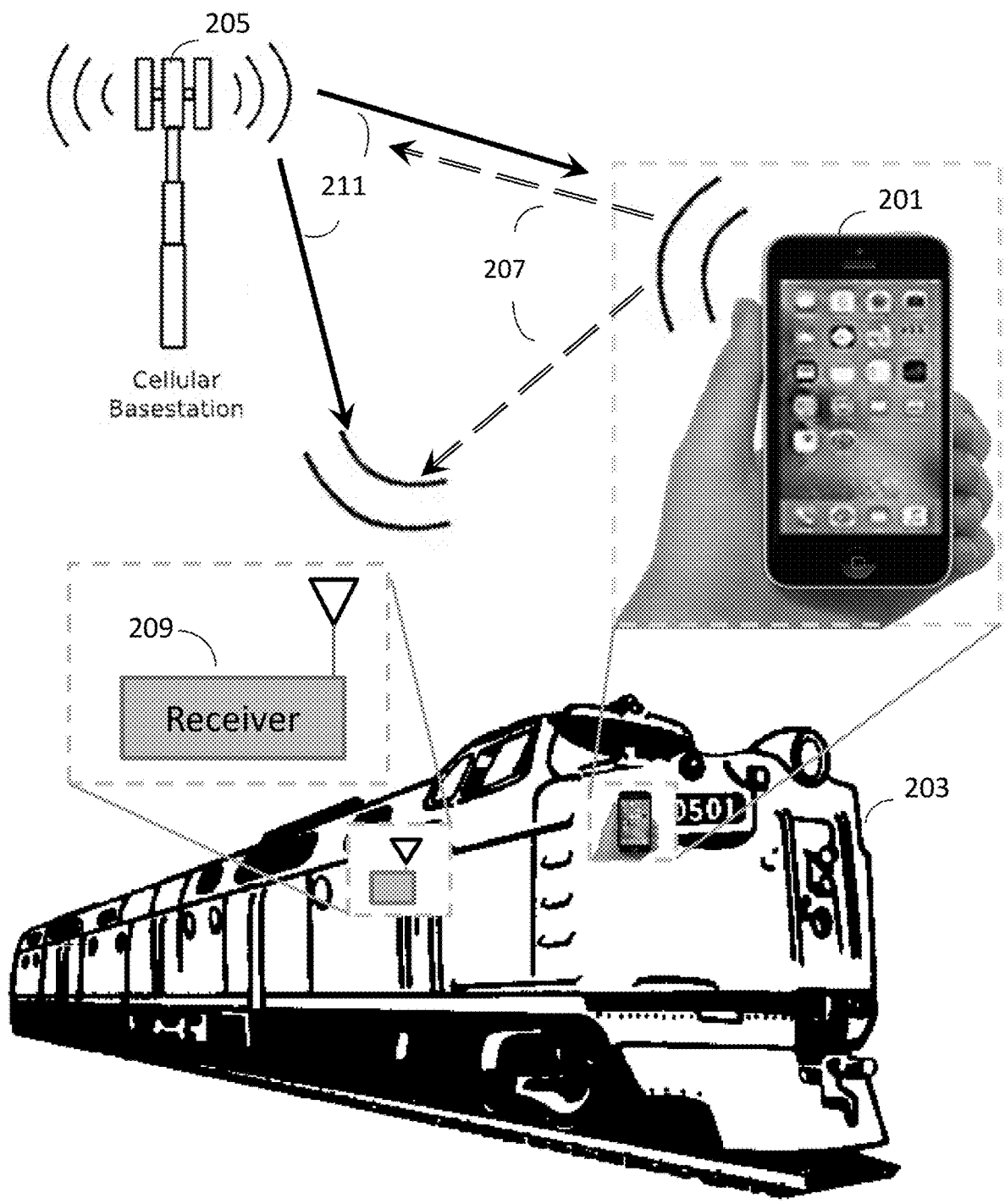
FIG. 2 shows a system for detection of a cellular device in accordance with aspects of this disclosure.

The process in FIG. 1 may be described further with reference to FIG. 2. While FIG. 2 illustrates a cellular phone 201 and a cellular basestation 205, the process may be implemented to detect any cellular device. A cellular device is any device with embedded cellular capability which is capable to access the cellular network. FIG. 2 shows a system for detection of a cellular device in accordance with aspects of this disclosure. The system in FIG. 2 comprises a cellular basestation 205, a cellular phone 201 and an RF signal processing receiver 209.

A signal processing receiver may comprise a microprocessor, digital signal processor, or other software programmable device. However, such devices may have limited ability to continually process real time signals. Additionally, such devices may need to handle other tasks within a signal processing receiving system. Thus, they may not be suitable for detecting a triggering event, where the channel needs to be continually monitored in real time. In such cases, it may be advantageous to use a Field Programmable Gate Array (FPGA) to continually monitor the uplink band for the triggering event. In such an implementation, the software programmable device may operate on other tasks while awaiting the triggering event. When the triggering event occurs, the sampled signal is passed from the FPGA to the software programmable device for subsequent demodulation and decoding.

When in use on a cellular network, the cellular phone 201 sends an RF uplink transmission 207 to one or more basestations 205 in a local area, i.e., in a cell. This uplink transmission 207 may also be detected and received by the RF signal processing receiver 209.

One or more RF signal processing receivers 209 may attempt to receive an uplink transmission 207 at an uplink frequency. In some situations, the number of potential uplink frequencies may be narrowed according to a predetermined CNDL and a determination of location. Each of the one or more RF signal processing receivers 209 may be directed to receive one or more RF uplink channel. Each of the one or more RF signal processing receivers 209 attempts to detect a triggering event. The triggering event in a cellular uplink band may include a high RF power level, a likely presence of a known sequence or signal within the received signal, or specific properties or structures of the received signal which indicate the received signal is likely structured and not random noise. The triggering event indicates that a cellular device may be transmitting.

However, the mere presence of RF power in the bands licensed for uplink cellular traffic may or may not be from the cellular phone 201. Though the cellular uplink bands are licensed bands, and thus only licensed devices are allowed to transmit in these bands, it is quite common to have sporadic and unintended RF signals in these bands that could be detected as falsely identified as cellular devices requesting network. Therefore, when the RF signal processing receiver 209 detects power in a cellular uplink band, the RF signal processing receiver 209 may determine the bandwidth of the potential uplink transmission. In order to detect real transmissions from a cellular device while simultaneously preventing falsely identifying sporadic or unintended RF signal as real transmissions, RF signal processing receiver 209 may apply a computational kernel. The computational kernel may yield a numerical score indicating the likelihood of the presence of an uplink signal and a list of possible carrier frequencies at which the uplink signal may reside.

If the bandwidth of the potential uplink transmission is commensurate with the assumed technology (GSM, UMTS, LTE, etc.), the presence of a basestation is investigated. If the likelihood from the computational kernel exceeds a threshold, the presence of a cellular device is deemed likely and the presence of a basestation is subsequently investigated. The cellular basestation 205 sends an RF downlink transmission 211 to the cellular phone 201, which may also be received by the RF signal processing receiver 209. In cellular technologies, downlink and uplink frequencies are typically paired. If the presence of a cellular device has been deemed likely at a particular uplink frequency, RF signal processing receiver may attempt to decode an RF downlink at the downlink frequency paired with the uplink frequency. If an RF downlink is successfully decoded, the presence of the cellular device is confirmed, as are the frequency, band, channel, and cellular provider of the cellular device.

Figure 3:
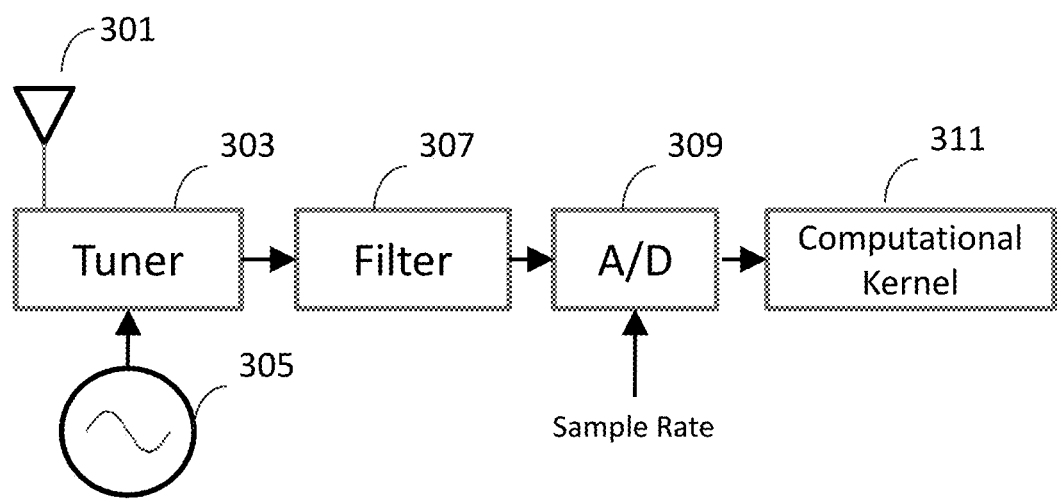
FIG. 3 shows an example receiver in accordance with this disclosure.

In some situations, a full cellular network scan may be predetermined or may be learned over time. A CNDL may store relevant data such as the cellular technology and frequency of the uplink and downlink channels. The CNDL may be subsequently sorted based on the location of a receiver 209. For example, once a potential uplink transmission is determined and the bandwidth is verified, the CNDL can be consulted. Based on the center frequency of the potential uplink transmission and the current location of the receiver 209, the CNDL can sorted to give a likelihood that a cellular basestation is close enough to be able to receive the potential uplink transmission. Furthermore, if the cellular basestation is not close enough, a downlink transmission can also be measured to confirm the CNDL. Discrepancies between the CNDL and actual measurements may be used to adapt or train the CNDL FIG. 3 illustrates an example receiver in accordance with this disclosure. The antenna 301 receives a signal that is shifted in frequency by tuner 303. Tuner 303 may comprise one or more filtering stages and one or more mixing stages. Tuner 303 may shift the received signal down according to a variable local oscillator stage 305.

The down-converted signal may then pass through filter 307. Filter 307 attenuates signals outside of the band (or sub-band) of interest. The filtered signal may be sampled by an analog-to-digital converter (A/D) 309. Digital samples from the A/D 309 may be processed by one or more computational kernels 311.

The maximum bandwidth of the band (or sub-band) of interest is determined by the sample rate of the A/D 309. For example, if the sample rate of the A/D 309 is 50 MHz, the digital bandwidth of the samples processed by a computational kernel 311, would be 50 MHz.

The sample rate of the A/D 309 also determines the widest bandwidth of filter 307. For example, if the sample rate of the A/D 309 is 50 MHz, filter 307 (in combination with any filtering in tuner 303) may provide a low-pass filter response with a cut-off frequency of 25 MHz or less. If filter 307 is a low-pass filter, the tuner output may be a complex I/Q signal (i.e., comprising In-phase and Quadrature-phase signals) centered around 0 Hz. The I signal may be filtered in parallel with the Q signal by filter 307. The filtered I/Q signal may be sampled by A/D 309.

Alternatively, tuner 303 may down-convert the received signal to a low intermediate frequency (IF). In this embodiment, filter 307 may be a band-pass filter centered on the IF frequency, and the A/D 309 would sub-sample the IF signal. Conversion to I/Q samples may then be performed digitally in the computational kernel 311.

Prior to searching for a cellular uplink signal, the variable local oscillator stage 305 must be set such that the tuner 303 outputs the band (or sub-band) of interest. As discussed above, the band (or sub-band) of interest may be centered at 0 Hz or a predetermined IF.

Table 1, below, describes the locations of two UTRA (UMTS Terrestrial Radio Access) bands. In UTRA band 5, the uplink channels occupy 25 MHz. If the sample rate of the A/D 309 is 50 MHz, the entire bandwidth of the uplink channels in UTRA band 5 may be captured and analyzed. In UTRA band 2, the uplink channels occupy 60 MHz. If the sample rate of the A/D 309 is 50 MHz, the entire bandwidth of the uplink channels in UTRA band 2 may overlap in the digital domain. In this situation, UTRA band 2 may be captured and analyzed as two or more sub-bands.

TABLE 1

| UTRA band | Uplink frequencies UE transmit (MHz) | Downlink frequencies UE receive (MHz) | Bandwidth (MHz) | Duplex gap (MHz) |
|---|---|---|---|---|
| 2 | 1850-1910 | 1930-1990 | 60 | 80 |
| 5 | 824-849 | 869-894 | 25 | 45 |

Figure 4:
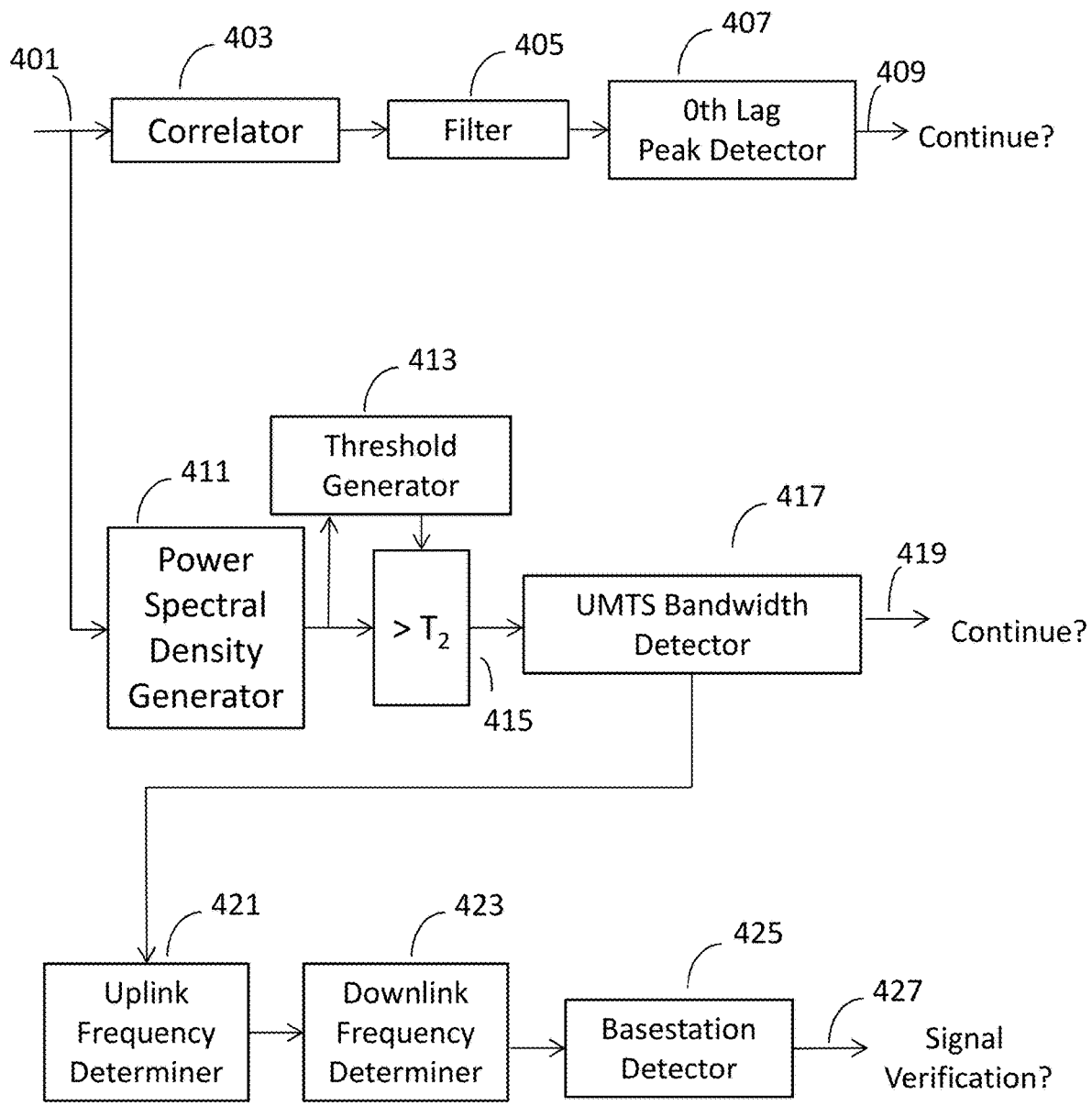
FIG. 4 shows an example computational kernel for detecting a UMTS cellular device in accordance with this disclosure.

A UMTS cellular device may be detected in accordance with the system in FIG. 4. The detection may begin by obtaining a plurality of I/Q sample sets (g(t, n)) 401, each set spanning a 10 msec time slot (n). For a sampling rate of 50 MHz, for example, each sample set 401 comprise 500,000 I/Q samples. Consecutive sample sets 401 may be processed by correlator 403. Correlator 403 may: compute an FFT (G(f, n)=FFT[g(t, n)]) of sample set 401; multiply respective components of consecutive FFT's (G*(f, n) G(f, n−1)); and compute an inverse FFT of the product (IFFT[G(f, n) G*(f, n−1)]). Correlation discontinuities may be reduced by using a large FFT size (up to the number of samples in 10 ms) and/or calculating over multiple frames.

The output of correlator 403 may be filtered by filter 405. For example, filter 405 may accumulate an absolute value (or power) of the correlation results over N (e.g., 10) slots. In block 407, the first element (the 0th lag) of the accumulation may be compared to an average of the other correlation elements. If the ratio of the 0th lag to the other correlation elements is above a predetermined threshold ($T_1$), a strong peak is determined. If the accumulated correlation results do not have a strong peak near the 0th lag, the receiver may be tuned to a different center frequency and new I/Q sample sets 401 may be sent to correlator 403.

If the accumulated correlation does have a strong peak near the 0th lag, a possible UMTS signal is detected at 409, and the I/Q sample sets 401 are processed further. A power spectral density (PSD) generator 411 may generate a PSD of the I/Q sample sets 401 using Welch's method, where a window function is applied to each I/Q sample set 401 prior to generating a periodogram. Threshold generator 413 generates a "signal present" threshold ($T_2$). For example, the "signal present" threshold may be twice the standard deviation of the entire PSD. Alternatively, the "signal present" threshold may be the mean plus the standard deviation multiplied by a constant. The "signal present" threshold may be applied in comparator 415 to generate a Boolean vector from the PSD.

The UMTS bandwidth detector 417 may sweep through the Boolean vector to find contiguous areas above the "signal present" threshold. If no contiguous window of "signal present" Boolean values matches (within a small margin of error) the bandwidth of a UMTS signal at 419, the receiver may be tuned to a different center frequency and new I/Q samples 401 may be sent to correlator 403.

If a contiguous window of "signal present" Boolean values matches (within a small margin of error) the bandwidth of a UMTS signal at 419, processing continues. The uplink frequency determiner 421 translates the center of the contiguous window to a potential uplink center frequency of a UMTS signal. The potential uplink center frequency of the UMTS signal with respect to the center frequency of the receiver may also be determined based on the phase change between I/Q samples (not illustrated). For example, the phase of the autocorrelation between one set of samples and another set of samples delayed by a single sample will be the phase rotation that occurs in one sample period.

The downlink frequency determiner 423 translates the potential uplink center frequency into a set of one or more potential downlink center frequencies. The basestation detector 425 surveys the potential downlink center frequencies for the presence of a UMTS basestation. If a UMTS basestation is detected at 427 on any of the potential downlink center frequencies, the detected uplink signal is confirmed. Further verification may be performed by decoding cellular parameters (e.g., carrier, base station ID, etc) from the detected basestation downlink signal.

Figure 5:
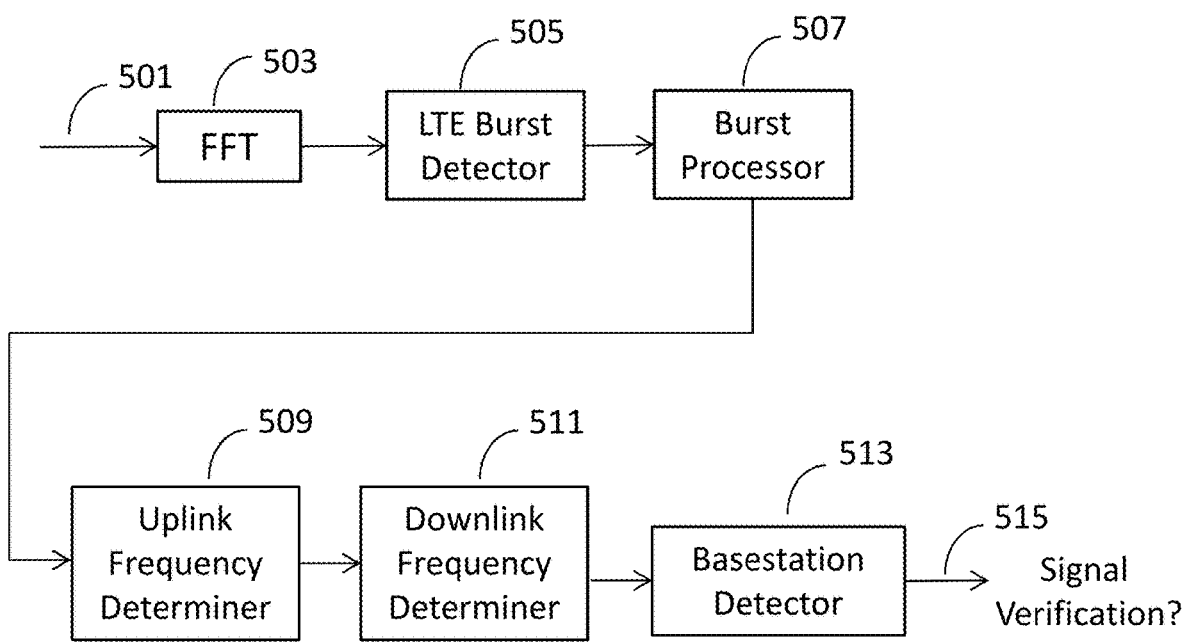
FIG. 5 shows an example computational kernel for detecting an LTE cellular device in accordance with this disclosure.

An LTE cellular device may be detected in accordance with the system in FIG. 5. The detection may begin by obtaining I/Q samples 501 over a time period (e.g., 50 msec). For a sampling rate of 30.72 MHz, for example, a 500 μsec LTE burst comprises 15,360 I/Q samples. FFT 503 may process the I/Q samples 501. For example, a length 128 FFT may be applied to a plurality of evenly spaced I/Q sample sets. If the plurality of evenly spaced I/Q sample sets are non-overlapping, up to 120 time samples (i.e., 120 FFT's) may be produced over a 500 μsec period. Fewer time samples may also be used by allowing gaps between sequential I/Q sample sets. For a sampling rate of 30.72 MHz and a length 128 FFT, each FFT bin corresponds to 240 kHz. If the band of interest is larger than the sample rate, the receiver may be sequentially tuned to a different center frequency for each sub-band.

LTE burst detector 505 may filter the power in each FFT bin. As part of the filtering, LTE burst detector 505 may create a threshold according to the standard deviation of the time samples in each bin (e.g., over 50 msec). The output power vector of each FFT bin may then be converted into a Boolean vector that indicates which time samples exceed the threshold. LTE burst detector 505 may filter each Boolean vector to find possible LTE bursts. For example, if 120 time samples are computed over a 500 μs burst, a possible LTE burst may be indicated by a filter length of slightly less than 120. For each possible LTE burst, the FFT bin and the burst's location in time are recorded. If the band of interest comprises multiple sub-bands, the sub-band offset, FFT bin, and the burst's location in time are recorded.

Burst processor 507 determines the time and frequency offsets differences between the possible LTE bursts. If two bursts are offset in time by 500 μs (+/− some predetermined uncertainty) and offset in frequency by an empirically determined LTE channels spacing (e.g., 5, 10, 15, or 20 MHz), the possible LTE burst is used by the uplink frequency determiner 509 to determine the potential uplink center frequency.

The downlink frequency determiner 511 translates the potential uplink center frequency into a set of one or more potential downlink center frequencies. The basestation detector 513 surveys the potential downlink center frequencies for the presence of an LTE basestation. If an LTE basestation is detected at 515 on any of the potential downlink center frequencies, a detected uplink signal is confirmed. Further verification may be performed by decoding cellular parameters (e.g., carrier, basestation ID, etc) from the detected basestation downlink signal.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for detecting a cellular device, the method comprising:
    acquiring, via an analog-to-digital converter (A/D), a block of digitized samples in an uplink frequency band, wherein a wideband receiver comprises the A/D;
    applying one or more computational kernels to the block of digitized samples to determine a possible uplink transmission from the cellular device;
    detecting a cellular basestation associated with the possible uplink transmission; and
    determining a likelihood that the cellular basestation is close enough to receive the possible uplink transmission based on a location of the wideband receiver.

2. The method of claim 1, wherein applying one or more computational kernels to the block of digitized samples comprises measuring a physical layer parameter of the possible uplink transmission.

3. The method of claim 1, wherein locating a cellular basestation comprises decoding a downlink broadcast message.

4. The method of claim 1, wherein determining the bandwidth of the possible uplink transmission is followed by estimating a center frequency of the possible uplink transmission.

5. The method of claim 1, wherein the wideband receiver is operable to determine a duration of the possible uplink transmission.

6. The method of claim 5, wherein a list of cellular basestations is maintained in the wideband receiver.

7. The method of claim 6, wherein each entry in the list of cellular basestations is associated with a location.

8. The method of claim 6, wherein the list of cellular basestations is shared with another wideband receiver.

9. The method of claim 1, wherein the wideband receiver and the cellular device are traveling in a vehicle.

10. The method of claim 1, wherein the method comprises locating the wideband receiver such that digitized samples of an uplink transmission from the cellular device are acquired by the wideband receiver when the cellular device is being used by a vehicle operator.

11. The method of claim 9, wherein the vehicle is a train.

12. The method of claim 10, wherein the vehicle operator is a train operator.

13. A system comprising:
    a wideband receiver, comprising an analog-to-digital converter (A/D), operable to determine a presence of a cellular device based on digitized samples of an uplink transmission and an associated downlink transmission;
    a memory operable to store a list of cellular basestations based on location; and
    determining a likelihood that the cellular basestation is close enough to receive the possible uplink transmission based on a location of the wideband receiver.

14. The system of claim 13, wherein the wideband receiver is operable to apply one or more computational kernels to a block of digitized samples of an uplink frequency band.

15. The system of claim 13, wherein the wideband receiver is operable to decode a downlink broadcast message.

16. The system of claim 13, wherein the wideband receiver is operable to determine a duration of a possible uplink transmission.

17. The system of claim 13, wherein the wideband receiver is operable to estimate a center frequency of the possible uplink transmission.

18. The system of claim 13, wherein a list of cellular basestations is maintained in the wideband receiver.

19. The system of claim 18, wherein each entry in the list of cellular basestations is associated with a location and one or more uplink center frequencies.

20. The system of claim 18, wherein the list of cellular basestations is shared with another wideband receiver.

21. The system of claim 13, wherein the wideband receiver and the cellular device are traveling in a vehicle.

22. The system of claim 21, wherein the vehicle is a train.

23. The system of claim 13, wherein the wideband receiver is located such that digitized samples of the uplink transmission are acquired by the wideband receiver when the cellular device is being used by a vehicle operator.

24. The system of claim 23, wherein the vehicle operator is a train operator.

\* \* \* \* \*